Sept. 26, 1939.    J. L. RAESLER    2,174,062
SPEED AND POWER GOVERNOR
Filed Aug. 23, 1937    2 Sheets-Sheet 2
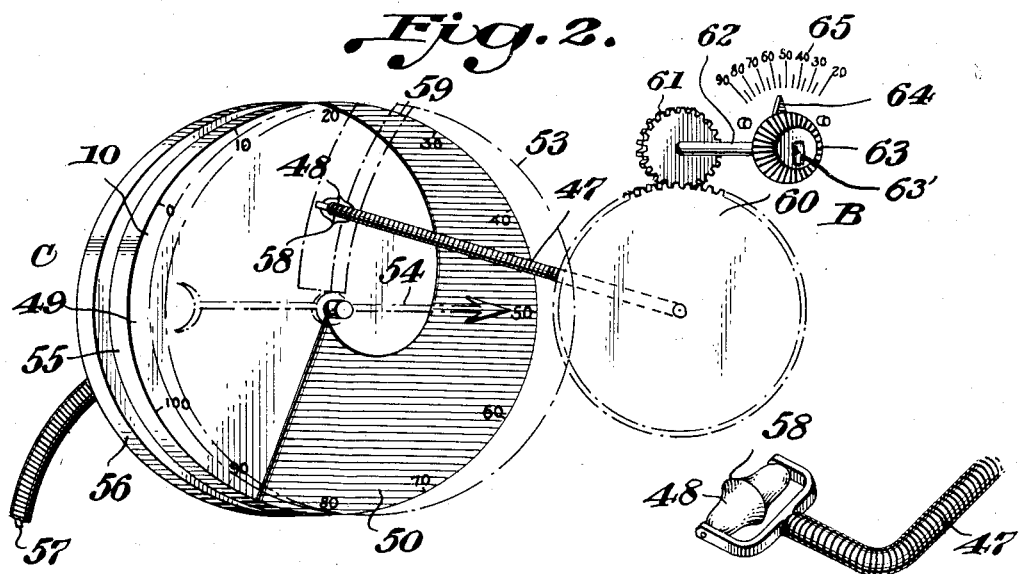
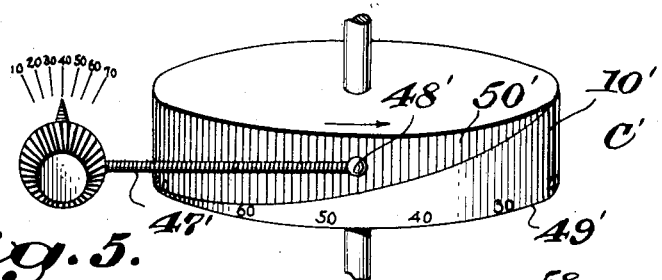
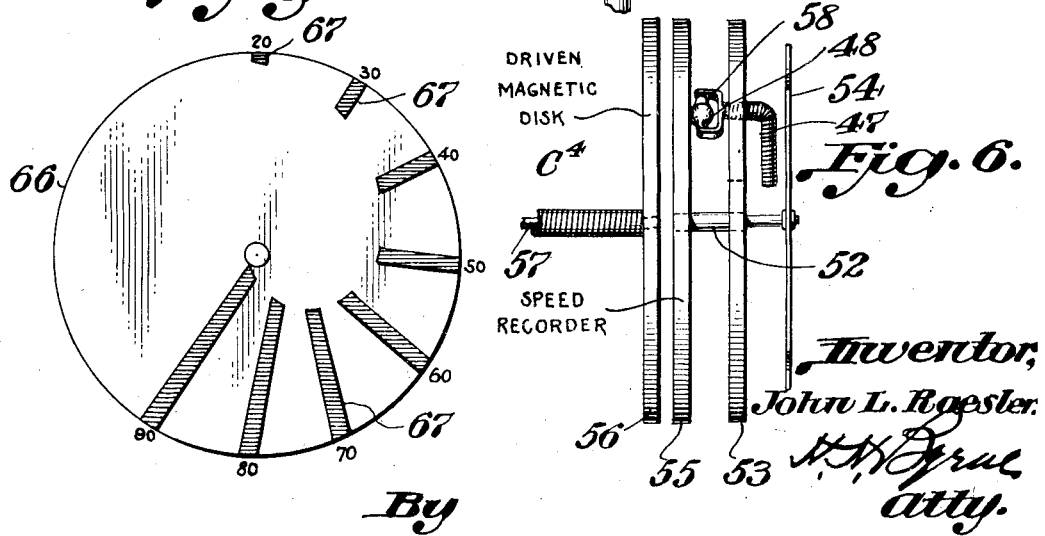
Inventor,
John L. Raesler.
atty.

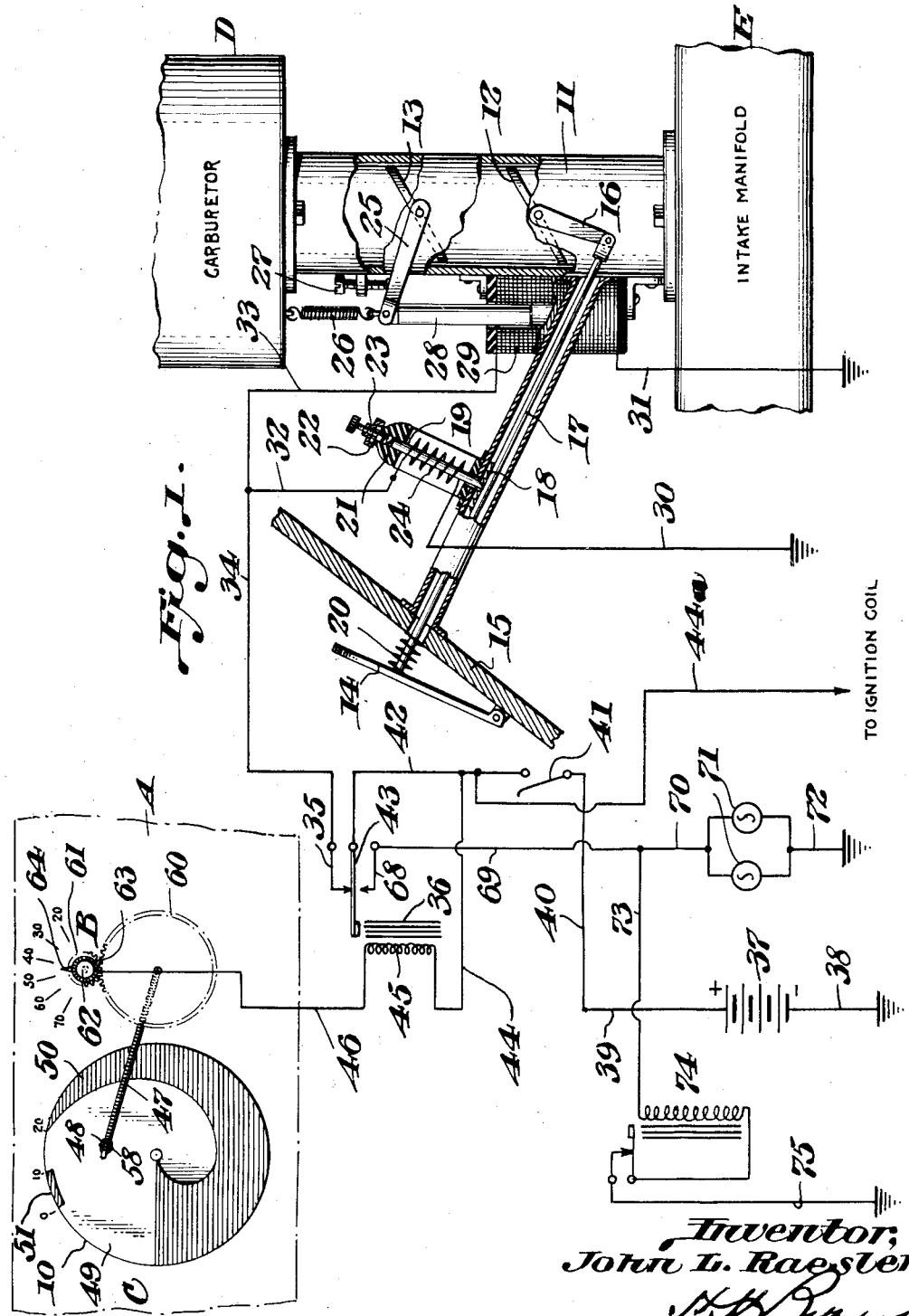

Patented Sept. 26, 1939

2,174,062

UNITED STATES PATENT OFFICE 2,174,062

SPEED AND POWER GOVERNOR

John L. Raesler, Auburn, N. Y., assignor of one-half to Chester J. Bills, Auburn, N. Y.

Application August 23, 1937, Serial No. 160,544

4 Claims. (Cl. 180—82)

This invention relates to speed governing devices for controlling the maximum speed of motors and more particularly automotive vehicles.

An object of the invention is to provide such a speed governing device with a manually adjustable means whereby the maximum speed may be increased or decreased at the will of the operator, which means in an automobile may comprise a rotatable control member associated with the instrument board and operable in conjunction with the automobile speedometer to control the automobile maximum speed as desired from the minimum to maximum miles per hour as indicated by the automobile speedometer.

Another object of the invention is to provide such speed governing mechanism in an automobile which coacts with the automobile speedometer and the motive power intake of the automobile driving motor for controlling the driving motor so that the speed of the automobile will not exceed a predetermined speed in accordance with the speed for which the control mechanism is set in its relation with respect to the speedometer. Such a maximum control mechanism is particularly useful during the breaking in period of a new vehicle and at any time can be employed to control the desired maximum speed as in city driving.

Another object of the invention is to provide in connection with a variable maximum speed control device a locking mechanism whereby unauthorized persons cannot increase or decrease the speed range as set by the control device in its locked condition.

Another object of the invention is to provide such governing mechanism which cooperates with the power intake of a driving motor to prevent an increase in the power supply to the motor when the member driven thereby is being driven above the maximum speed.

Another object of the invention is to provide such governing mechanism which cooperates with the power intake of a driving motor to shut off the power supply to the motor to a predetermined minimum when the member driven thereby is being driven above the maximum speed.

Another object of the invention is to provide such governing mechanism in cooperation with the speedometer of an automobile and its driving internal combustion engine or other type of driving motor which will be controlled by the ignition lock or other locking means whereby the power supply to the driving motor is effectively shut off when said lock is operated.

Another object of the invention is to provide in conjunction with such a speed governing mechanism suitable signal devices preferably in an automobile, a light or visible signal on the interior thereof which will indicate when the maximum speed is attained and also an audible signal may be provided which will operate as a warning signal which may be positioned on the interior or exterior of the vehicle. With the maximum speed of the device set for zero or minimum speed the signals operate a warning that unauthorized persons are attempting to operate the vehicle thereby an additional theft-proof feature is provided.

Still further objects, details and advantages of my invention will appear in the following specification of a satisfactory and preferred embodiment of my invention applied to an automobile as illustrated in the accompanying drawings wherein,—

Figure 1 is a diagrammatic illustration showing a maximum speed controlling device in accordance with the invention, parts being shown in elevation and parts in section.

Figures 2 and 3 are enlarged perspective views of details of the speed responsive and control elements.

Figure 4 is a perspective view similar to Figure 2 showing a modified type of speed responsive device as may be employed in some speedometers.

Figure 5 is a face view of a modified form of contact disc which may be employed in the speed responsive device of the speedometer as shown in Figure 2.

Figure 6 is a side elevation showing the relation of elements of the speedometer parts illustrated in Figures 2 and 5.

Referring to Figure 1 only so much of the instrument board A of an automobile is illustrated as to show the cooperation of a manually operated speed adjusting member B with a rotatable plate or disc 10 incorporated in an automobile speedometer C. Portions of fuel intake for an internal combustion engine are illustrated including a carburetor D and intake manifold E being shown connected by a valve controlled conduit 11 containing the usual accelerator valve 12 and an auxiliary valve 13.

Accelerator valve 12 has a control pedal 14 pivotally mounted on the floor board 15 of the automobile and is connected therewith by means of the usual lever 16 and rod 17. Rod 17 is provided with ratchet teeth 18 which are adapted to be engaged by a tooth on a reciprocatory armature 19 which when in engagement prevents any further depression of the pedal 14 but permits the compression spring 20 under the pedal to raise the pedal and draw with it rod 17 thereby rotate valve 12 in a closing direction in accordance with the amount the pedal is raised. Armature 19 is reciprocably mounted in a casing 21 having at its outer end a spring 22 which may be adjusted by screw adjusting means 23 for varying the pressure of the engagement of the toothed end of the armature with ratchet teeth 18 on rod 17. Within casing 21 is a solenoid 24 surrounding the armature 19, the lower portion of which is magnetic material, so that when the solenoid is energized the tooth on the armature will be held in a retracted position to permit free movement of rod 17 as desired by the operator of the vehicle.

Auxiliary valve 13 has its arm 25 connected to a spring 26 which tends to hold this valve closed or slightly open as determined by a set screw 27 which engages the arm and may be adjusted to permit idling of the motor or any predetermined minimum speed thereof as desired. For sake of clearness idling adjustments for accelerator valve 12 are not shown on the drawings but may be of the same character or of usual construction. The valve 13 has its arm 25 connected with a plunger 28 extending into a solenoid 29 which is adapted to be energized during the normal operation of the vehicle for drawing the plunger 28 downwardly thereinto and thereby maintaining valve 13 in its open position.

While solenoids 24 and 29 and the elements associated therewith are preferably entirely concealed they are shown mounted on the casing members of the respective elements for illustrative purposes. These solenoids each has a terminal grounded as represented by means of conductors 30 and 31 respectively and their other terminals are shown connected by conductors 32, 33 and 34 with the upper stationary contact 35 of a speed control relay 36.

While both the accelerator valve 12 and auxiliary valve 13 are shown with control systems for the speed control either may be used separately if desired. However, as will be seen, the combination of the controls for both these valves has numerous advantages which are not had by either one alone.

It will be seen that when it is desired to operate the vehicle employing both valves 12 and 13 solenoids 24 and 29 must be energized and for this purpose circuits are shown for energizing them from the car battery 37. The circuits from the battery include the grounded connections 38 from one side of the battery and 30 and 31 respectively to the solenoids, and from the other side of the battery by way of conductors 39 and 40, ignition switch 41, conductor 42, armature 43 of relay 36, contact 35 and conductors 34, 32 and 33 to solenoids 24 and 29 whereby they will be energized. When ignition switch 41 is closed the circuit is closed to the ignition system (not shown) by the connection of conductor 42 with conductor 44a indicated "To ignition coils", in the usual manner as will be readily understood.

When ignition switch 41 is closed energy is also supplied by way of conductors 42 and 44 to the operating solenoid 45 of relay 36, the circuit being completed therefrom by means of conductor 46, arm 47 of the speed control device and the contact 48 on said arm when it is in engagement with a grounded portion of disc 10 of the speedometer and back to battery by way of the grounded conductor 38 thereof.

The rotatable plate or disc 10 comprises a depressed or insulated portion 49 and a raised conducting portion 50 by which when in contact with contact element 48 completes the circuit to ground. This disc 10 as shown in Figure 1 optionally may have a small conducting segment 51 arranged in the low speed range, zero to 10 miles per hour for rendering the vehicle theftproof. The conducting portion 50 is shown shaded and is preferably arranged to extend from a 20 miles per hour point spirally to the center for engagement with the contact 48 at various speeds above 20 miles per hour.

In Figures 2 and 6 particularly, this disc is shown mounted on a shaft 52 back of the speed indicator dial 53 (shown dotted in Figure 2) and between the indicator needle 54 and the speed responsive disc 55 (noted in Figure 6 as a speed recorder). It will be noted that the speed responsive disc 55, disc 10 and needle 54 will be proportionally turned in accordance with the speed of the vehicle by means of a usual form of rotary magnet 56 (indicated in Fig. 6 as a driven magnetic disc) which is driven by a speedometer shaft 57 in the usual manner. It will be noted, as shown in Figure 3, that contact 48 is preferably formed with a sharp roller edge 58 for making good contact and yet with as little friction as possible so that it will not materially interfere with the free motion of the disc; the contact point and edge at least of the conducting portion 50 of disc 10 are preferably silvered to improve the conductivity although the solenoid 45 of relay 36 is designed to operate on a very small amount of current so that the contact point and surface should remain in good condition for long periods of time.

While arm 47 may extend under indicator dial 53 it is shown extending over the same with its contact carrying end bent so as to extend through a slot 59 in the indicator dial 53. The inner end of this arm 47 is mounted on a gear sector or wheel 60 and small swinging motions may be imparted thereto by means of a small gear 61 meshing therewith, the shaft of which has a manually operable knob 63 of the adjusting member B mounted thereon. Knob 63 has a pointer 64 which cooperates with a scale 65 which is calibrated so as to correspond with the speed calibrations of disc 10, the readings thereby indicating the settings of the arm for making contact with the conducting portion 50 of disc 10 at the different speeds.

The manual speed control mechanism, adjusting member B, is provided with a locking device to render any desired setting thereof permanent to anyone not having the proper key, or to any unauthorized persons. The control of the contact of the arm on the disc 10 may be fitted with a key insertable in a keyhole 63' in knob 63 for operating any suitable form of lock. This locking arrangement is used to set the control arm to any desired speed, and when the key is withdrawn, no further adjustments can be made by any person not having the proper key.

In Figure 4 a modified form of speedometer C' is indicated, that is a rotary drum 10'. This drum has an insulated portion 49' and a conducting portion 50'; in this instance the contact 48' of arm 47' is shown in contact with the conducting portion 50' of the drum.

In Figure 5 another form of rotary plate 66 is shown which may be substituted for disc 10 in Figures 1 and 2. This plate has a series of conducting contacts 67 of varying radial lengths extending inward from the periphery of the plate.

This arrangement may be preferable in some instances in that it provides for controls at regular or desired speed intervals, as shown at 20, 30, 40, 50, 60, 70, etc., miles per hour, ten mile increase intervals, and the setting of the manually controlled adjusting member B is thereby simplified and obviously the desired speed intervals may be more readily obtained and with greater precision.

Again referring to Figure 1 it will be noted that relay 36 has a lower stationary contact 68 adapted to be engaged by the movable contact 43 when the solenoid 45 of this relay is energized. When contact 43 engages contact 68 the circuit is made from the battery 37 by conductors 39 and 40, ignition switch 41, conductor 42, closed contacts 43 and 68, conductors 69 and 70 through one or more signal devices 71 which are preferably visible signals mounted at desired points in the automobile, and grounding conductor 72 back to the battery by the grounding conductor 38 thereof. At the same time a conductor 73 connected with conductor 69 continues a parallel circuit through an automobile signal device illustrated in the form of a buzzer and from thence to the ground by a conductor 75. This audible signal device is of any desired type and is preferably mounted on the exterior of the vehicle as a warning signal indicating a high speed of the vehicle or as a warning to the owner that an unauthorized person is attempting to operate the same.

In operation, referring particularly to Fig. 1 it will be noted that should the manually operated speed adjusting member B be set so that the arm 47 is in a minimum speed position the contact 48 will be in engagement with the small contacting segment 51 and relay 36 will be energized when in this condition, if the ignition switch 41 is closed, and the signals 71 and 74 are both operated; obviously however, in the employment of this system any of these signal devices may be dispensed with or rendered inoperative. Contacts 43 and 68 being closed by the energization of relay 36 the circuit by way of contact 35 remains open whereby solenoids 24 and 29 are ineffective to raise armature element 19 and lower plunger 28 associated with the respective coils. Therefore the valves 12 and 13 are both maintained in their closed or minimum position so that an additional flow of fuel mixture is effectively shut off from the intake manifold of the engine.

In the normal operation of the vehicle the ignition switch 41 is closed by inserting a key in the ignition lock (not shown), but preferably prior thereto the manually operated speed adjusting member B is set by turning the knob 63 so that the pointer 64 is opposite the desired maximum speed at which the operator desires a car to travel and this effectively opens the circuit through relay 36 shutting off the signal device and energizing solenoids 24 and 29 so that accelerator valve 12 is released and auxiliary valve 13 is opened. The vehicle is then operated in the usual manner and the speed thereof is increased by depressing the foot accelerator pedal 14 or operating the rod 17 to effect the desired opening of accelerator valve 12 for operating the vehicle at various speeds. Should the speed of the vehicle afterwards increase to a speed above the speed at which the speed governing device is set contact 48 will engage the conducting portion 50 of disc 10 and thereby energize relay solenoid 45 of relay 36. This will close contacts 43 and 68 and thereby operate any signal device which may be energized by the completion of this circuit. At the same time contact 43 is moved away from contact 35 and thereby solenoids 24 and 29 are de-energized; this effects the engagement of the tooth on the end of armature 19 with the ratchet 18 on rod 17 and prevents any increase in the opening of accelerator valve 12 but allows the closing thereof as heretofore explained. This is sufficient for normal driving of the car in most instances but the closing of the additional valve 13 renders the control more effective in maintaining the speed at or below the maximum desired speed. Closing of valve 13 shuts off the gas sufficiently so that if valve 12 has been opened too far the vehicle speed cannot be power operated in excess of the maximum desired speed and the closing of this valve is also more effective in maintaining a low idling speed of the engine when contact 48 of arm 47 is in engagement with the small conducting segment 51 positioned between the zero speed and the 10 mile per hour speed.

As heretofore stated the modified form of rotary plate 66 shown in Fig. 5 may be more effective in obtaining precise speed adjustments at certain intervals of speed and this plate when substituted for disc 10 operates in the same manner. Similarly the drum type of speedometer as shown in Fig. 4 will operate for governing the speed in the same manner as the disc type functions.

While the manually operated speed adjusting member B and the speedometer C may be preferably mounted so as to be concealed in the speedometer casing for obvious reasons, they are diagrammatically shown mounted side by side on the instrument panel. It will be obvious to those skilled in the art that various changes may be made in this device without departing from the spirit of the invention and therefore the invention is not limited to what is shown in the drawings and described in the specification but only as indicated in the appended claims.

I claim:

1. In a vehicle speed control device including a fuel intake conduit provided with valve means, an accelerator pedal provided with a rod member connecting said valve means, and a speed responsive means, ratchet teeth provided on said rod member, a solenoid provided with reciprocating ratchet engaging means in alignment with the ratchet teeth, and means including a switch connecting the solenoid with the speed responsive means whereby at a predetermined speed the speed responsive means will actuate said switch to in turn deenergize said solenoid to close said reciprocating ratchet engaging means against said ratchet teeth.

2. In a vehicle speed control device comprising manual speed selecting means, a speed responsive switch, an accelerator pedal, an accelerator rod connected to said pedal, ratchet teeth on said rod, a fuel intake conduit, an accelerator valve within said fuel intake conduit connected to an end of said rod, a housing for said rod secured to the body of the vehicle, a solenoid connected with said speed responsive switch and mounted on said housing in alignment with the ratchet teeth on said rod, and reciprocating ratchet engaging means within said solenoid adapted to engage with said ratchet teeth when said solenoid is deenergized in response to said speed responsive switch.

3. A maximum speed governing device for internal combustion engine driven vehicle comprising a fuel mixture intake conduit for the engine, a valve in said conduit for controlling the passage of fuel therethrough, an accelerator rod for operating said valve, ratchet teeth on said rod, a magnet having a movable armature to engage said ratchet teeth when deenergized, a speedometer switch responsive to the speed of travel of the vehicle, means operative by said speedometer switch when a maximum speed of the vehicle has been attained for deenergizing said magnet thereby preventing further operation of said valve to deliver additional fuel to said internal combustion engine.

4. A maximum speed governing device for an internal combustion engine driven vehicle comprising a fuel mixture intake conduit for the engine, an accelerator valve in said conduit for controlling the passage of fuel therethrough, an accelerator rod connected to said valve, ratchet teeth on said accelerator rod, an armature operating within said solenoid and normally urged into engagement with said ratchet teeth when the solenoid is de-energized, a speedometer driven in accordance with the speed of the vehicle, a switch closed by said speedometer at a pre-determined speed, a first circuit connected to said switch, a second circuit which includes said solenoid, means in said first circuit adapted to open the second circuit when said first circuit is energized, thus de-energizing said solenoid and allowing its armature to engage the ratchet teeth of said accelerator rod thereby preventing further opening of the accelerator valve.

JOHN L. RAESLER.